Figure 1:
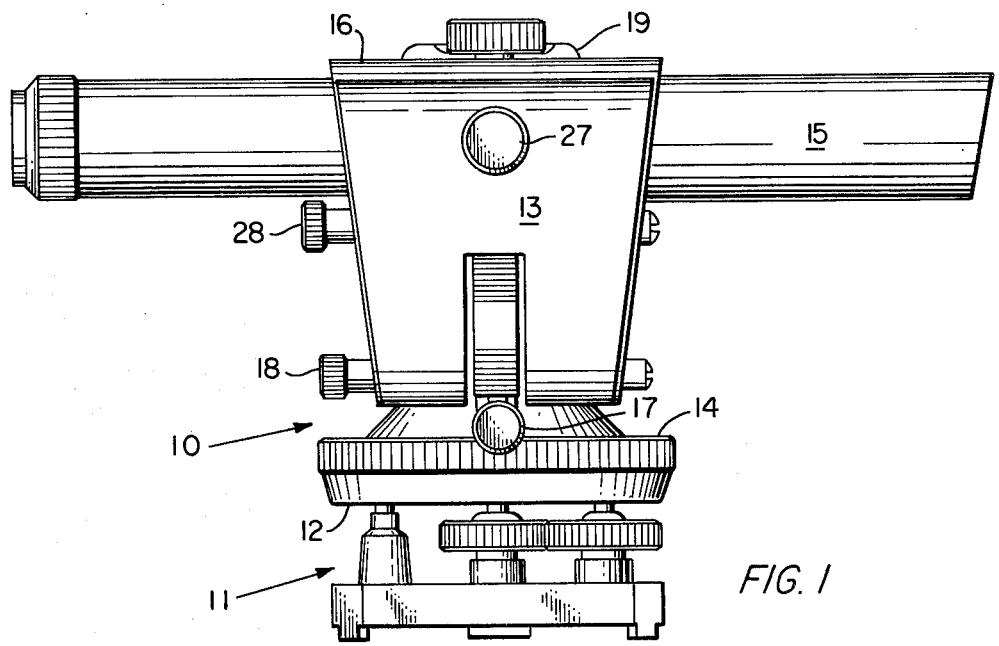

United States Patent [19]

Baker et al.

[11] 3,959,888

[45] June 1, 1976

[54] PRECISE INDEXING DETENT

[75] Inventors: Allister L. Baker, Denville; J. Peter E. Kooi, Succasunna, both of N.J.

[73] Assignee: Keuffel & Esser Company, Morristown, N.J.

[22] Filed: Mar. 3, 1975

[21] Appl. No.: 555,020

[52] U.S. Cl. .................................. 33/282; 33/1 D; 33/174 TB
[51] Int. Cl.² ........................................ G01C 1/00
[58] Field of Search ............ 33/281, 282, 283, 248, 33/1 D, 174 TA, 174 TB; 292/261, 302

[56] References Cited
UNITED STATES PATENTS

| | | | |
|---|---|---|---|
| 1,047,220 | 12/1912 | Heinrich | 33/282 |
| 2,485,846 | 10/1949 | Sanderson | 33/284 |

*Primary Examiner*—William D. Martin, Jr.
*Attorney, Agent, or Firm*—Lionel N. White

[57] ABSTRACT

A precise indexing detent comprises a pair of grooved members the plane groove faces of which define a polyhedron within which there may be positioned a sphere in surface contact with all such faces. A detent member comprising a spherical section is situated in close association with the grooved members to govern the positional indexing of movable apparatus parts as in a level-transit surveying instrument or drafting machine protractor head.

2 Claims, 4 Drawing Figures

PRECISE INDEXING DETENT

BACKGROUND

The present invention relates to detent means for precisely registering one or more relative positions between a pair of bodies of which at least one has normally free movement. Such means are particularly useful for indexing the primary level position of the telescope of a level-transit surveying instrument.

The level-transit finds widespread use in the construction trade where it is generally employed to determine azimuth and elevation angles as well as to establish spirit level datum planes. It is in respect of this latter function of the instrument that there is advantageously employed some means of readily locking, or indexing, the telescope with respect to the alidade standard in order to reestablish, after making elevational sightings, the perpendicularity between the line of sight and the vertical spindle axis. The capability of retaining a high degree of precision after extended use is a basic requirement for indexing detent means in a datum function instrument such as the level-transit. Previously available detent assemblies have, among other disadvantages, lacked such long-term precision.

In the field of level-transit instruments there have been utilized various types of level index detents, yet none have performed with the reliable precision exhibited by the present invention. For example, there has been described in U.S. Pat. No. 2,607,994 detent means comprising a lever with plano-parallel sides retractably positionable between a pair of lands to establish an index of the level line of sight in such an instrument. The degree of ease with which the lever in such an arrangement may be set to index the instrument depends in great measure upon the clearance between the abutting lands; however, the greater that dimension is set to obtain ease of operation, the less precise becomes the indexing of the level position of the telescope. Wear at the relatively fixed and broad surfaced areas of contact between the lands and lever as well as between the lever and its pivot pin results, with continued use, in further loss of precision of indexing.

Another level-transit instrument described in U.S. Pat. No. 2,674,044 employs a spring-urged pawl in conjunction with a bevel-walled receiving slot in an attempt to achieve datum plane indexing with a greater degree of precision and convenience. The additional use of a beveled pawl pivot slot was suggested as a means of reducing loss of precision occasioned by wear at contacting surfaces. The extent of area and fixed location of such surfaces continued, however, to lead to loss of index precision.

A further difficulty experienced in previous instruments of the type noted resulted from the relatively inflexible locking actions of the detent means employed. Thus, once engaged by such means in level datum position the telescope of the instrument and its horizontal axis and bearings were susceptible to damage from any accidental blow or other excessive force tending to plunge the telescope. Although the bevels in the latter-noted instrument were suggested as a means of preventing such damage they were found to be of little efficacy for that purpose after a short period of use and resulting wear and seating of parts. The spring-triggered action of the pawl of that instrument further caused repeated detent- and bearing-stressing shock as a result instant locking each time the telescope was rapidly pivoted to the location of the index point.

SUMMARY

The present invention alleviates the noted disadvantages of previously available detent means for level-transit instruments and further provides such highly precise detent means as may be more generally employed in other specific instruments where the detenting or indexing function is a repeatedly employed and integral element in the operation of the instrument. Such a precise function is additionally utilized, for example, for azimuth indexing in drafting machine protractor heads and in mechanical indexing tables.

The indexing detent means of the present invention consists essentially of three elements — a first groove or grooved member associated with the first of a pair of bodies between which there may normally be imparted relative adjacent surface movement, a second such groove or grooved member associated with the other of said pair of bodies, and a detenting element essentially comprising a spherical surface portion. The conformation of each of the noted grooves is, in its simplest form, a pair of intersecting plane surfaces; the orientation of the grooves being such that, when the pair of bodies are juxtaposed at the index point, the intersection edges are at an angle to one another and the groove faces form at least a section of a polyhedron, for example, a frustum of quadrilateral pyramid, within which a sphere may be set tangent to each of the groove faces. One of the pair of grooved members is normally fixed relative to the index location, and the detenting element is located closely adjacent the groove of that member and arranged for movement between alternative positions where it is withdrawn from the interior of the polyhedral section or is inserted into that section, usually with gravitational or other force urging its spherical surface toward the vertex and into contact with all of the respective groove faces.

In an arrangement as indexing means for a level-transit, for example, a first grooved member, or anvil, is firmly affixed to the telescope standard while the detent element in the form of a rod having a spherical end is mounted to the standard for axial movement to and from contact with the groove faces of the anvil. A second grooved member is similarly firmly mounted to a portion of the telescope support assembly which is rotatable about the telescope axle and in such a location as to lie closely adjacent the anvil at the telescope level datum position, the grooves of the two members there forming the noted polyhedral section.

With the detent rod retracted from contact with the groove faces and withdrawn from the polyhedral section, the telescope in its support assembly is free to be rotated about the telescope axle to establish a vertical sight plane, the associated grooved member describing with such rotation an arcuate path substantially tangent to the anvil. Setting that member in juxtaposition to the anvil and inserting the detent rod surface into the polyhedral section to contact all groove faces effectively immobilizes the support assembly with respect to the standard and reestablishes the level datum of the telescope.

DRAWINGS

Figure 2:
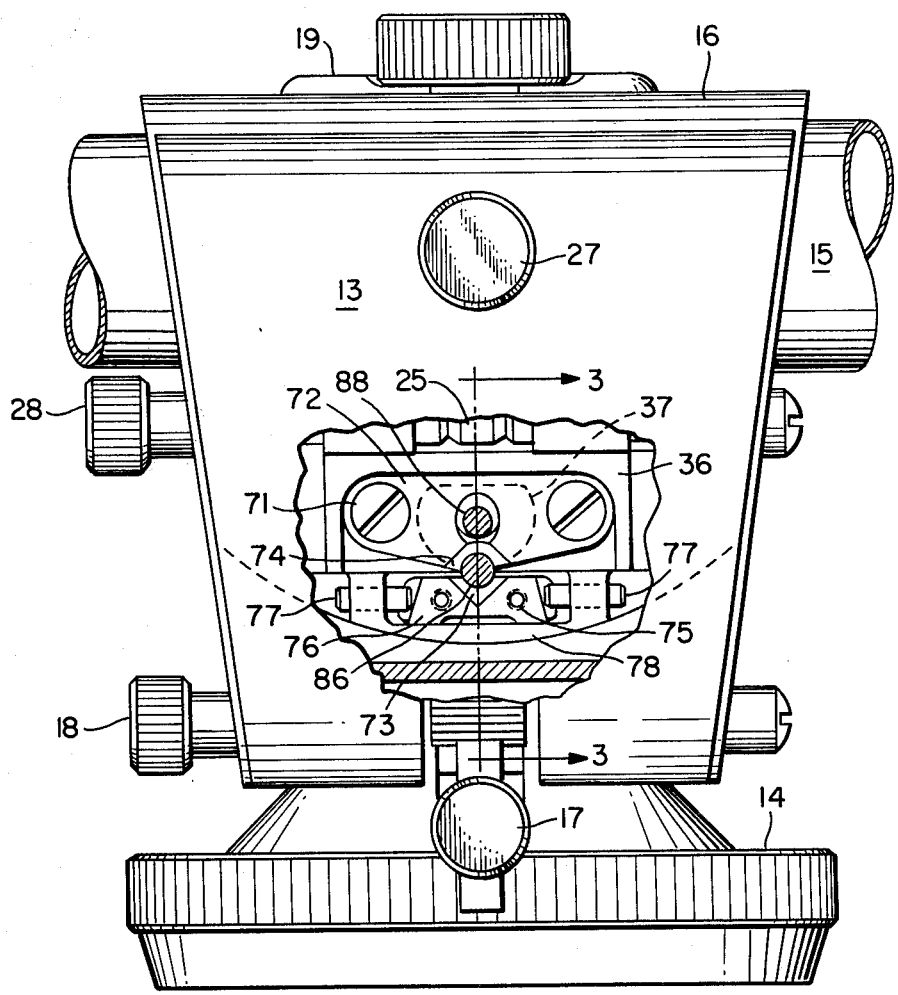
Figure 3:
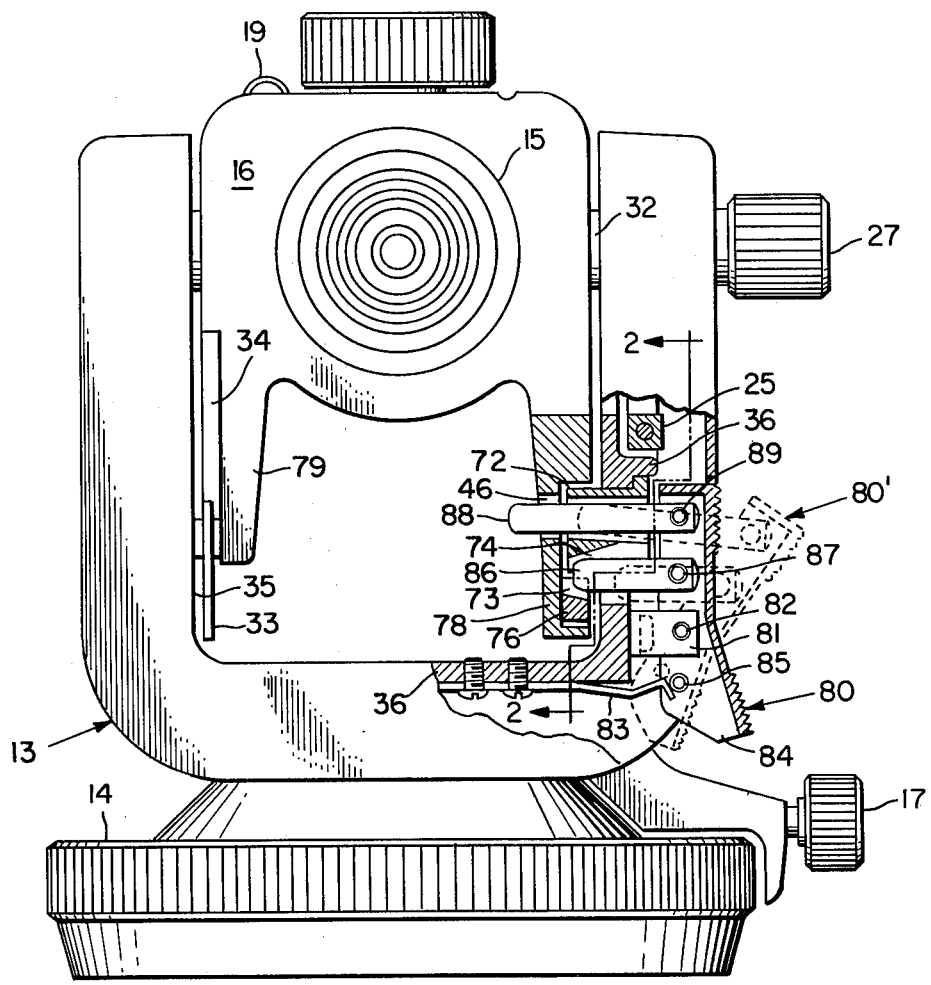
Figure 4:
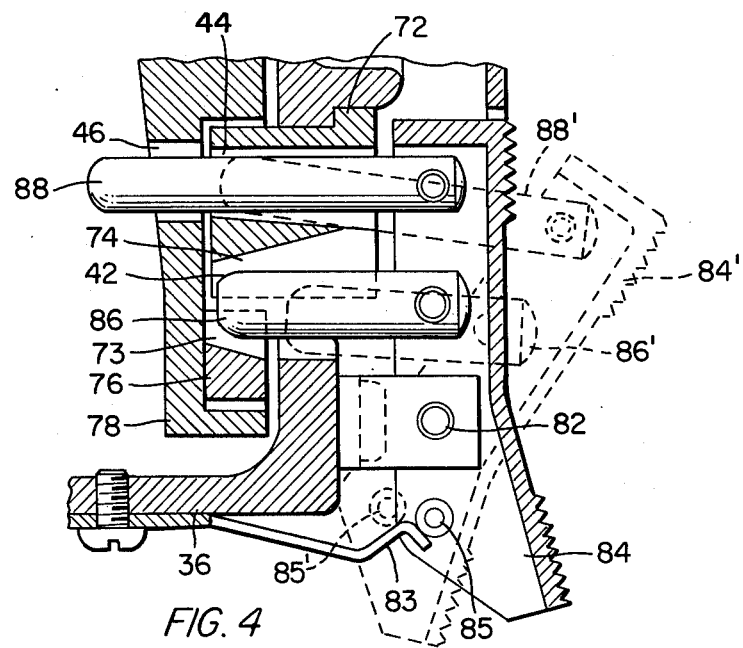

In the accompanying drawings:

FIG. 1 is a right side elevation view of a level-transit which may typically utilize indexing means according to the present invention;

FIG. 2 presents, in side elevation, and partial section taken at 2—2 (FIG. 3), a view of indexing means according to the present invention as embodied in the level-transit generally shown at FIG. 1;

FIG. 3 presents, in rear elevation and partial section taken at 3—3 (FIG. 2), another view of such detent indexing means in a level-transit; and FIG. 4 is an enlarged view of that portion of FIG. 3 which details the detent indexing means.

DESCRIPTION

The present invention will be described herein, for the most part, with particular reference being made to utilization as level datum index means in a level-transit. It will be recognized and should be borne in mind, however, that the detent means of the invention can be equally useful in numerous other applications, such as those hereinafter more specifically noted.

The instrument shown in FIG. 1 is typical of a level-transit widely employed in the construction trade, comprising an alidade assembly 10 of which alidade base plate 12 is mounted in three-point support on leveling screw assembly 11 and in the usual manner provides the bearing base for the alidade spindle (not shown). Affixed to the spindle for rotation therewith are the telescope standard assembly 13 and azimuth vernier plate 14 (not fully shown). For control of azimuth movement there are provided azimuth locking screw 17 and fine adjustment tangent screw 18.

The telescope 15 of the instrument is received in telescope support assembly 16 which in turn is rotatably mounted to standard assembly 13 by means of telescope axle 32 (FIG. 3) to provide line of sight elevations through a range of between approximately ±45° from the horizontal. Elevation vernier plate 33 is affixed to standard 35 and, along with vertical circle 34 mounted on depending portion 79 of support assembly 16, is visible through a window opening (not shown) in the left side of telescope standard assembly 13. Whenever the instrument is operated in the transit mode, movement of the telescope is controlled by locking screw 27 and tangent screw 28, the tip of the latter of which bears on the end of lever arm 25 to effect fine adjustments in line of sight elevation.

In operation, the instrument is initially brought into a level attitude through the use of leveling screw assembly 11 and spirit level 19. During the leveling operation telescope support assembly 16 is fixed in standard 13 by means of the indexing detent of the present invention. In such level datum position the line of sight of telescope 15 is precisely perpendicular to the alidade spindle as predetermined during final manufacture adjustment. With the instrument thus set, vertical circle 34 and vernier plate 33 register the level index and the alidade may be rotated about its spindle axis to sweep a level horizontal plane of sight.

In order to obtain elevated sight lines or derive vertical sight planes the indexing detent may be disengaged, thus freeing support 16 to rotate about axle 32 with telescope 15 transiting through its range of about 90°. Returning to the level mode of operation is readily achieved in an instrument embodying the present invention by bringing the telescope to an approximately level position, that is, within a few degrees of the level datum location, and depressing the detent control toggle. Thus actuated, the detent indexing means rotates the telescope support through the remaining few degrees to the precise level index and there arrests any further transitary movement. Throughout countless cycles of operation between the transit and level modes, detent means of the present invention provides level indexing which is consistently repeatable to within 2 seconds of arc.

As earlier noted, detent indexing means according to the present invention consists essentially of the combination of a pair of grooved members and a spherical detent element. Each of the grooved members is respectively associated with one of a pair of bodies the relative positions of which are precisely to be established and releasably fixed with respect to a predetermined datum index. The location of the grooves in each respective body is such that relative movement between the bodies brings the grooves into close juxtaposition where, at the precise point of index, the faces of the grooves, of which each groove most simply comprises two intersecting plane surfaces, combine to form, in extension, a pyramidal polyhedron within which there may be inserted a sphere which will simultaneously contact each of the two pairs of groove faces. From a consideration of the involved geometry of such an arrangement it will be apparent that while there can be but one relative location, i.e. the index datum, of the pair of grooved members to so receive a sphere there may be numerous sizes of spheres which will seat thus within the polyhedron of groove faces and any such sphere may be used as the detent element. Apparent also will be the fact that such element need not be a complete sphere, but will serve satisfactorily when spherical in that portion which contacts the groove faces. As will be seen later, a preferred embodiment of the present invention utilizes a cylindrical rod or bolt having only a spherical zone at that end which is directed toward the groove faces.

The present indexing detent assembly may be utilized wherever the two groove-associated bodies are arranged for relative planar displacement therebetween in such a manner as to bring the grooves into the described juxtaposition at some predetermined index point during the course of such displacement. The more common arrangements of the present invention would station the first grooved member and detent element at a fixed location with displacement of the second grooved member describing any of a straight, convex, or concave path which is essentially tangent to that location.

The spherical surface of the detent element not only provides the basic precision of indexing derived with the invention, but also results in the long term of such precision, the point contact between the sphere and plane groove faces presenting the minimum wear exposure during operation of the detent. As a means of further reducing distorting wear the detent element will, for the most part, be loosely mounted in the combination to allow, in addition to the primary index-seeking action of that element, a more random seating position within the polyhedron. The ultimate of such an arrangement would, of course, be a complete sphere mounted in an entirely free-floating manner.

PREFERRED EMBODIMENT

As utilized in indexing means for a level-transit, the present invention may readily be described with reference to the embodiment shown at FIG. 2 and FIG. 3 of the drawings.

Stationary grooved member, or anvil, 72 is received in an opening 37 in right hand (FIG. 3) telescope standard 36 and is firmly affixed to the standard as by screws 71. Anvil groove faces 74 are thus fixed with respect to the location of venier plate 33, likewise mounted to the telescope standard, and establish the index base of the instrument.

A second grooved member 76 is mounted upon depending arcuate portion 78 of telescope support assembly 16 by means of screws 75. Set screws 77 provide means for fine location adjustment of member 76 during assembly of the instrument, such adjustment establishing the accuracy of the perpendicularity between telescope axis and alidade spindle, and common compensating means are provided for adjusting the level index of vertical circle 34 mounted upon depending telescope support portion 79. Movement of the instrument telescope in the transit mode about horizontal axle 32 results in movement of grooved member 76 in a vertical arcuate path which lies closely adjacent anvil 72 at the point of vertical circle level index.

Pivotally mounted at 82 upon bracket 81 attached to standard 36 is detent assembly 80 comprising toggle 84 to which detent bolt 86 is loosely pivoted at stud 87. Further included in the detent assembly is safety bolt 88 similarly mounted to toggle 84 at pivot 89. The camming effect of leaf spring detent 83 upon toggle stud 85 urges the detent assembly toward either indexing position 80 or release position 80'.

Operation of the indexing detent means of the present invention may readily be seen with reference to FIG. 4. As there shown in indexing position toggle 84 is urged in the counter-clockwise direction about pivot 82 by the action of leaf spring detent 83 upon stud 85. Such action forces the spherical zone surface 42 of detent bolt 86 into contact with groove faces 74 of anvil 72 where the converging slopes of faces 74 direct the detent bolt toward and into contact with at least one of the faces 73 of grooved member 76. The camming action between detent bolt surface 42 and the contacted face 73 urges member 76 in that lateral (FIG. 2) direction which brings the other groove face 73 into contact with bolt surface 42, thereby effecting the firm four-point contact between each of the four groove faces 73, 74 and the spherical surface 42 of detent bolt 86, and establishing the precise location of the index datum of the instrument. Since telescope support assembly portion 78 to which member 76 is mounted follows the lateral movement of member 76, the support assembly 16 and telescope 15 are rotated about axle 32 to the index datum point where the telescope axis is precisely perpendicular to the alidade spindle axis.

Release of the indexing detent is effected by the application of sufficient force upon the lower portion of toggle 84 to overcome the effect of spring detent 83 and allow the toggle to pivot clockwise to a position, generally indicated at 84', where detent 83 bears upon stud at 85' to retain the toggle in released position. As will be apparent, detent bolt 86 follows the movement of the toggle and is thus withdrawn from engagement with groove faces 73, 74 to a position at 86' which is sufficiently removed from member 76 to allow free movement of the latter, with rotation of telescope support 16, through the full range of its arcuate path.

Also in loose pivotal attachment to toggle 84 is safety bolt 88 which, following the movement of the toggle, is withdrawn to a position 88' within access bore 44 of anvil 72 and out of the rotational path of support portion 78. Bolt 88 provides a safety feature in the present embodiment which prohibits the detent bolt from automatically becoming seated in detent grooves whenever the telescope support assembly is rapidly rotated through the level datum position. As previously noted, earlier level-transit instruments suffered extensive misalignment and structural damage as a result of such automatic locking of their spring-loaded detent elements.

The present safety feature comprises, in addition to bolt 88, an oversized bore 46 in support portion 78 which is generally coaxially aligned with bore 44 of anvil 72 when the telescope support is at the level datum position. The diameter of bore 46 is such that insertion of bolt 88 is prohibited except in that range of telescope elevation displacement which is less than about two degrees from the level datum position. Thus, in order that toggle 84 may be rotated counter-clockwise to a point of lock-urging action of leaf spring detent 83 it is necessary that rotation of the telescope support assembly be substantially halted in that range of 4 – 5° at the level datum position. The result of this arrangment is that detent bolt 86 can be urged by spring 83 into indexing engagement with groove faces 73, 74 only when the telescope is relatively stationary in close proximity to the level position. A jarring index locking action is thereby eliminated.

The indexing detent arrangement is the present embodiment provides a second safety feature which alleviates another disadvantage of previous instruments, in particular the susceptibility of such an instrument to misalignment or structural damage as a result of an accidental blow or other excessive force exerted upon the telescope in such a manner as to impart rotation against a firmly set indexing latch. In the instant invention the sloping faces of the detent grooves provide a camming action upon the spherical surface 42 of detent bolt 86 under such sudden rotational force and tend to expel bolt 86 from the distorting polyhedron. Sufficient force which would otherwise damage the instrument merely overcomes the detenting action of leaf spring 83 and allows toggle 84 with bolts 86, 88 to move completely to detent release position 84'.

As should be readily apparent, the degree of force which a detent will tolerate prior to disengagement is in great part determined by the slope and disposition of the detent groove faces 73, 74. In the present embodiment, broadly useful results are achieved with grooves of both anvil 72 and member 76 comprising plane faces at dihedral angles of about 90° and being symmetrically disposed, at the level index datum location, with their respective intersection edges at about 15° to the horizontal thereby forming an angle between them of about 30°. Thus situated, the groove faces establish, at the index point, a square pyramid. As will be further apparent, not only may the dihedral and intersection edge angles be varied, but also groove disposition assymetry may be utilized to achieve a preselected disposition of the detent arrangement toward release under application of force in the preferred of one or the other direction. Such an arrangement of the present invention might be employed as clutching or incremental motion means.

While the present indexing detent means has been described with respect to an embodiment wherein it is utilized to define a single datum location, it should be clear that a plurality of indices may be precisely located in any device simply by incorporating a like plurality of grooved members at pre-selected positions along the normal path of a mobile device element. Thus, a series of grooves radially disposed at regular intervals about the axis of rotation of a body would serve, in cooperation with fixed grooved anvil and spherical detent members, to establish a precise protractor assembly such as is normally employed in a drafting machine head or an indexing table. Likewise, lateral indexing may be effected with linear arrangements of detent grooves, and index locations may be readily increased without loss of precision through the expedient of multiplexing a plurality of anvil and grooved members.

What is claimed is:

1. In a level-transit comprising an alidade including a telescope standard and means pivotally mounting a telescope for transit about a horizontal transverse axis, the improvement in means for arresting the transitary movement of the telescope in precise register with a fixed index, said improvement comprising:
    a. a first grooved member affixed to the telescope standard to thereby establish said index location;
    b. a second grooved member affixed to means mounting said telescope for transitary movement;
    c. the respective grooves of said first and second members consisting essentially of a pair of intersecting plane surfaces;
    d. said second member being situated so as to follow, during said telescope movement, a fixed path passing closely adjacent to said first member;
    e. said first and second members being so oriented as to be in close juxtaposition at said index location with their respective groove faces combining to form at least a section of a quadrilateral pyramid within which section a sphere may be placed in simultaneous contact with said section faces;
    f. selectably positionable toggle means pivotally mounted to one of said standard and said telescope mounting means;
    g. detent means comprising an elongated element including a spherical zone surface at its distal end and being loosely mounted by its proximal end to said toggle means for directing movement of said element along its longitudinal axis between a release mode wherein said element distal end is withdrawn from said pyramid section and an indexing mode wherein said element distal end is located within said pyramid section with said spherical surface in simultaneous contact with said section faces;
    h. actuable means for urging said detent element in the direction of said distal end toward the vertex of said pyramid, thereby to effect and maintain said simultaneous contact between said spherical zone and section face surfaces, said urging means being actuated by selected positioning of said toggle means in said indexing mode; and
    i. means preventing the actuation of said urging means whenever said first and second grooved members are other than juxtaposed substantially at said index location.

2. The improvement according to claim 1 wherein
    a. said telescope standard and said telescope mounting means have respective openings therethrough, which openings are so situated as to communicate only when the grooves of said first and second grooved members are juxtaposed substantially at said index location thereupon to conjointly form through said standard and said mounting means an open corridor oriented substantially parallel to the longitudinal axis of said detent element, and
    b. said means preventing the actuation of said urging means comprises a rod member loosely mounted by its proximal end to said toggle means for movement, concomitant with said detent element, along its longitudinal axis within said corridor, said rod member being of such a length as to bridge the separation between said standard and said mounting means when said toggle means is in said indexing mode and to be incapable of bridging said separation when said toggle means is in said release mode.

* * * * *